US005929412A

United States Patent [19]

Nakatani

[11] Patent Number: 5,929,412

[45] Date of Patent: Jul. 27, 1999

[54] METHOD AND DEVICE FOR COUNTING CUT SHEETS

[75] Inventor: Nobuyuki Nakatani, Himeji, Japan

[73] Assignees: Wing Design Limited Liability Company, Himeji; Core Tech System Co., Ltd., Hyogo, both of Japan

[21] Appl. No.: 08/751,993

[22] Filed: Nov. 19, 1996

[51] Int. Cl.[6] .............................. G06C 3/00; B61L 21/00; G06F 17/80; G06M 7/00

[52] U.S. Cl. ........................ 235/89 R; 235/489; 235/379; 377/8

[58] Field of Search .................................. 235/98 R, 489, 235/379, 89 R; 377/8

[56] References Cited

U.S. PATENT DOCUMENTS

| | | | |
|---|---|---|---|
| 1,803,624 | 4/1931 | Lard . | |
| 2,805,825 | 9/1957 | Jorgensen et al. | 235/92 |
| 3,084,932 | 4/1963 | Schiller et al. | 271/63 |
| 3,986,712 | 10/1976 | Hasegawa | 271/124 |
| 4,147,339 | 4/1979 | Shiina | 271/7 |
| 4,157,822 | 6/1979 | Miller | 271/3.1 |
| 4,474,365 | 10/1984 | DiBlasio | 271/3 |
| 4,482,147 | 11/1984 | Hibi et al. | 271/229 |
| 4,522,519 | 6/1985 | DuBois | 400/624 |
| 4,566,109 | 1/1986 | Sanuga | 377/2 |
| 4,854,757 | 8/1989 | Kikuchi | 400/605 |
| 4,889,240 | 12/1989 | Sato et al. | 209/534 |
| 5,254,841 | 10/1993 | Watabe et al. | 235/379 |

FOREIGN PATENT DOCUMENTS

| | | |
|---|---|---|
| 56-76882 | 6/1981 | Japan . |
| 63-37492 | 2/1988 | Japan . |
| 3-235186 | 10/1991 | Japan . |

*Primary Examiner*—Donald Hajec
*Assistant Examiner*—Daniel Sherr
*Attorney, Agent, or Firm*—Merchant, Gould, Smith, Edell, Welter & Schmidt, P.A.

[57] ABSTRACT

A method is provided for counting cut sheets such as bank notes. A loose bundle of cut sheets is supported in a predetermined posture, and the cut sheets of the supported bundle are successively fed obliquely relative to an edge of each remaining cut sheet of the supported bundle. Passage of a corner of each successively fed cut sheet across a predetermined position is detected, and the resulting detection signal is processed to provide a count of each successively fed cut sheet.

11 Claims, 9 Drawing Sheets

METHOD AND DEVICE FOR COUNTING CUT SHEETS

BACKGROUND OF THE INVENTION

1. Field of the Invention

The present invention relates to a device for counting cut sheets such as bank notes, gift coupons, lottery tickets, and postcards. In particular, the present invention relates to a small-sized portable counter for cut sheets. The present invention also relates to a method for counting cut sheets.

2. Description of the Related Art

A device for counting cut sheets is widely used as a part of a bank notes processing machine such as cash dispenser. A cut sheets counting device is also used as an independent device such as bank notes counter.

Each of the typical prior art devices for counting cut sheets equally comprises a feed member such as feed roller for successively feeding each cut sheet from a loose bundle of cut sheets by friction, a detector for detecting passage of the fed sheet before discharging to a re-stacking unit, and a counting unit for providing a count of the fed sheets in response to a detection signal from the detector. Such a device is disclosed in Japanese Patent Application Laid-open Nos. 56-76882 (laid-open Jun. 24, 1981), 63-37492 (laid-open Feb. 18, 1988) and 3-235186 (laid-open Oct. 21, 1991) for example.

In the typical prior art counter described above, each of the cut sheets is fed lengthwise or widthwise thereof, and the detector is made to detect passage of the cut sheet as a whole. Thus, a predetermined interval is needed between a previously fed sheet and a subsequently fed sheet, thereby requiring an intermittent drive mechanism for the feed member. As a result, the counter tends to be large-sized, complicated and costly.

Further, due to the need for complete separation between the successively fed sheets, a long transfer path is also required in addition to the need for the re-stacking unit for collecting the completely separated sheets, which leads to a further size increase (hence a weight increase), a further complication and an increased number of components. Moreover, due to the size and weight increase, it is not easy for a business person to carry the counter for counting bank notes at the location of business (e.g. sales).

SUMMARY OF THE INVENTION

It is, therefore, an object of the present invention to provide a method and a device for counting cut sheets which is capable of eliminating or reducing the above-described problems of the prior art.

According to one aspect of the present invention, there is provided a method for counting cut sheets comprising the steps of: supporting a loose bundle of cut sheets in a predetermined posture; successively feeding the cut sheets of the supported bundle obliquely relative to an edge of each remaining cut sheet of the supported bundle; detecting passage of a corner of each successively fed cut sheet across a predetermined position; and processing a detection signal to provide a count of each said successively fed cut sheet.

According to another aspect of the present invention, there is provided a device for counting cut sheets comprising: a receiver member for supporting a loose bundle of cut sheets in a predetermined posture; a feed member for frictionally feeding the cut sheets of the supported bundle successively and obliquely relative an edge of each remaining cut sheet of the supported bundle; drive means for driving the feed member; a drag preventive member provided in facing relation to the feed member for preventing each remaining cut sheet of the bundle from being dragged by a previously fed cut sheet; detection means provided near the feed member for detecting passage of a corner of each successively fed cut sheet; and counting means for processing a detection signal from the detection means to provide a count of each successively fed cut sheet.

According to the present invention, since detection is performed only with respect to a corner of each cut sheet, it is unnecessary to completely separate a counted sheet from the next sheet. Thus, there is no need for providing a high-precision intermittent feed mechanism and a long transfer path, thereby realizing a reduction in the overall size, weight and cost of the counter. Further, since the cut sheets may be successively fed in partially overlapping condition, re-stacking or re-bundling of the counted sheets can be greatly facilitated.

Preferably, when each cut sheet is elongate with two shorter edges and two longer edges like a bank note, the receiver member may be made to support the bundle of cut sheets in a standing posture with the shorter edges of each cut sheet directed upward, and the feed member may comprise a feed roller held in contact with one shorter edge of each cut sheet of the supported bundle. Further, the feed roller may preferably have a rotary axis which is contained in a plane substantially parallel to the plane of each cut sheet of the supported bundle but inclined relative to the longer edges of each cut sheet. Moreover, the receiver member may be made to support the bundle of cut sheets in a manner such that said one shorter edge of each cut sheet of the supported bundle is positioned lower than the other shorter edge of each cut sheet. Such a structure is advantageous for ensuring reliable feed of each cut sheet and reliable detection of a corner of the cut sheet.

Advantageously, the cut sheets counter may further comprise a presser member for pressing the supported bundle of cut sheets against the feed roller, and an opposing pressing roller held in contact with the other shorter edge of each cut sheet of the supported bundle for preventing each fed cut sheet from pivoting about the feed roller. The additional provision of these elements prevents erroneous feed and detection of each cut sheet.

According to a preferred embodiment of the present invention, the receiver member, the feed member, the drive means, the detection means and the counting means are accommodated in a main case member to which a closure case member is hinged for opening and closing the main case member. Such an embodiment is advantageous in that the counter can be carried and used very conveniently.

Preferably, the closure case member may be hinged to a bottom portion of the main case member, and the feed member may be made to feed each cut sheet of the supported bundle for discharging upwardly and toward the closure case member which is pivoted open.

In this case, the successively discharged cut sheets may be collected and stacked on the closure case member.

To facilitate collection and stacking of the discharged cut sheets, the main case member may have an upper wall formed with a bevel discharge guide edge for smoothly directing each discharged cut sheet toward the closure case member which is pivoted open, whereas the closure case member may be provided with a stacking guide for guiding successively discharged cut sheets into a stack for re-bundling.

Other objects, features and advantages of the present invention will become apparent from the following description of the preferred embodiment given with reference to the accompanying drawings.

DETAILED DESCRIPTION OF THE PREFERRED EMBODIMENTS

Figure 1:
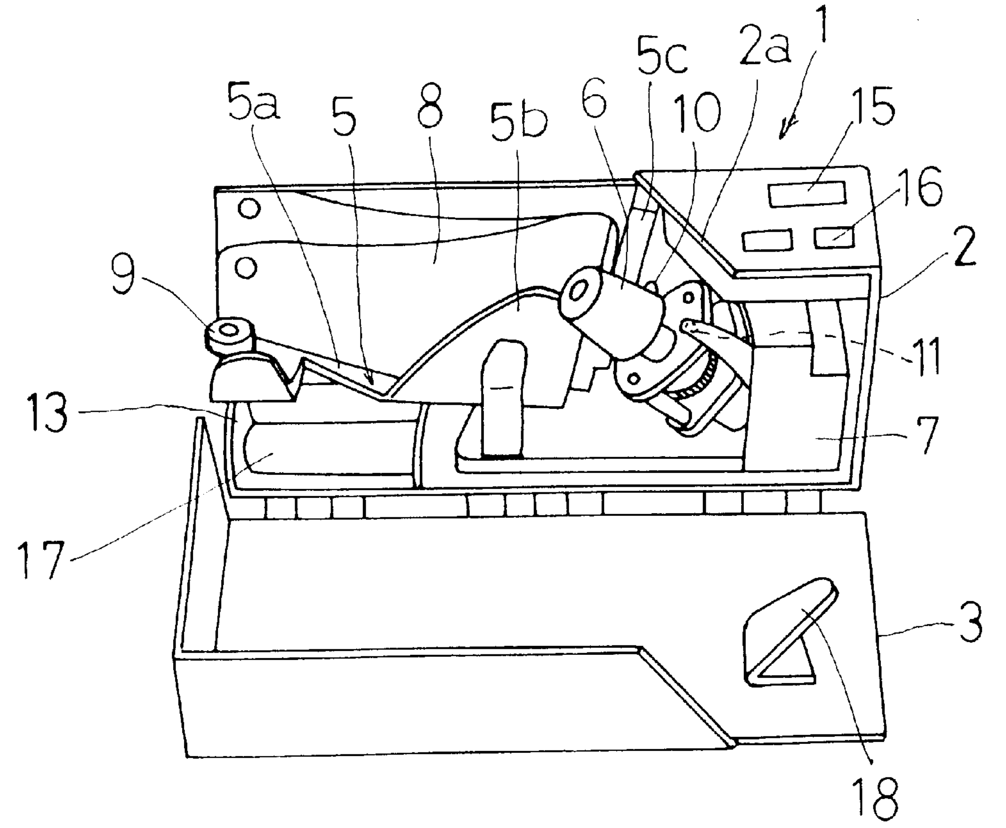
FIG. 1 is a perspective view illustrating a cut sheets counter in its open state according to an embodiment of the present invention.

Referring first to FIGS. 1 through 7 of the accompanying drawings, there is illustrated a counter for cut sheets (e.g. bank notes, gift coupons, lottery tickets, and etc.) according to an embodiment of the present invention. The counter generally designated by reference numeral 1 comprises a main case member 2 and a front closure case member 3 hinged to the main case member 2.

Figure 6:
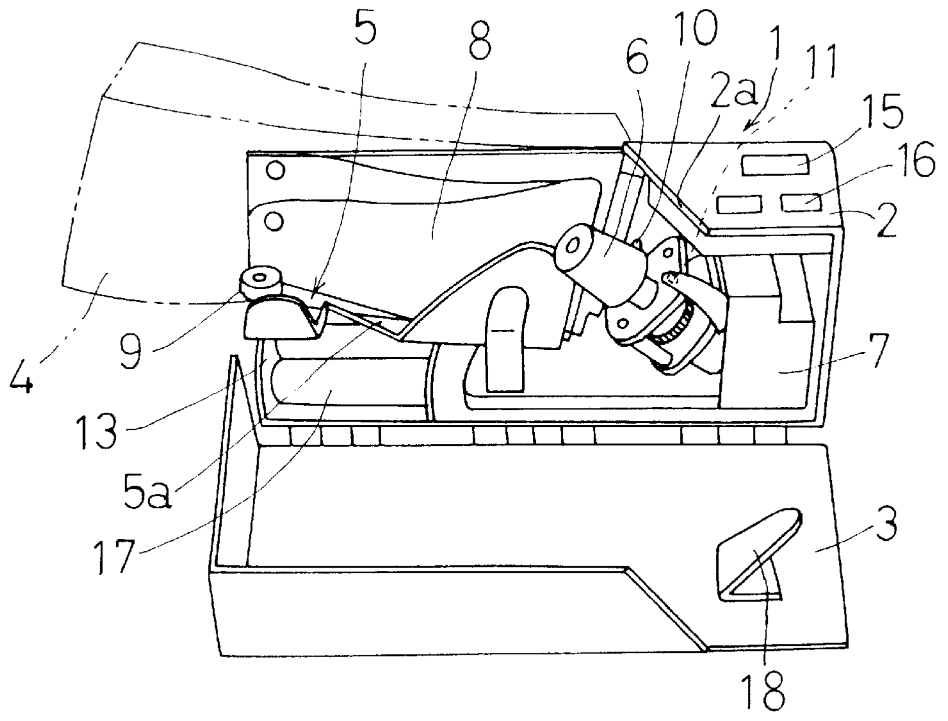
FIG. 6 is a perspective view similar to FIG. 1 but showing the same counter immediately after placing a bundle of cut sheets for counting.
Figure 7:
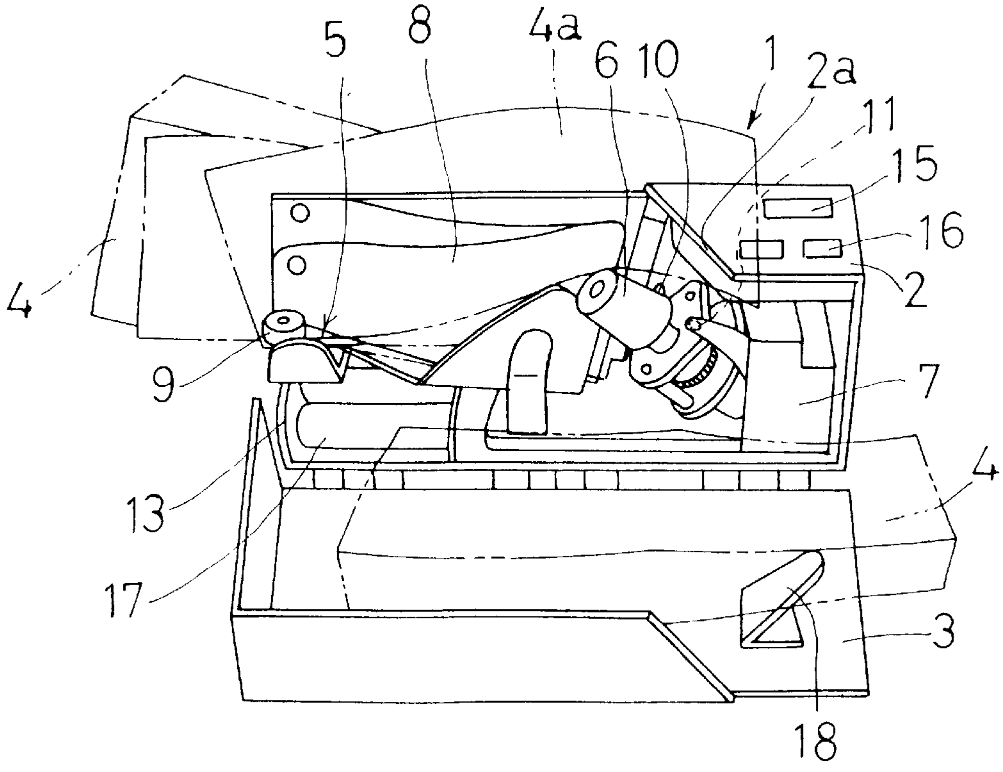
FIG. 7 is a perspective view also similar to FIG. 1 but showing the same counter in counting operation.

The main case member 2 is provided with a receiver stand 5 for supporting a bundle 4 of cut sheets (see FIG. 6). The receiver stand 5 includes a bottom support portion 5*a* for supporting the cut sheets bundle 4 in a standing posture with a longitudinal inclination so that the leading edge of each cut sheet is located slightly lower than the trailing edge. The receiver stand 5 also includes a front retainer portion 5*b* for holding the front face of the cut sheets bundle 4, and a leading edge retainer portion 5*c* for holding the leading edge of each cut sheet of the bundle 4. It should be appreciated here that the term "bundle" is used here to mean the cut sheets are collected together without binding.

A feed roller 6 is provided in facing relation to the edge retainer portion 5*c* of the receiver stand 5. The feed roller 6 is driven for rotation by a drive motor M (see FIG. 12) through a reduction mechanism (not fully shown) housed in a gear box 7 which is in turn housed in the main case member 2. The feed roller 6 is made of a material, such as urethane rubber, having a high friction coefficient, and is rotatable about an axis which extends obliquely in a plane parallel to the plane of each cut sheet in the bundle 4. Thus, when rotated, the feed roller 6 feeds the cut sheets successively one by one from the bundle 4 in an obliquely upward direction.

A presser spring 8 is attached to the main case member 2 above the receiver stand 5 for pressing the cut sheets bundle 4 against the feed roller 6. An opposing presser roller 9 is provided immediately above the bottom support portion 5*a* of the receiver stand 5 in facing relation to the presser spring 8 for contact with the cut sheets bundle 4 near the trailing edge of each cut sheet to prevent unexpected pivoting of the cut sheet. The opposing presser roller 9 may also be made of urethane rubber.

A drag preventive member 10, which may be preferably made of urethane rubber, is provided forwardly from the presser spring 8 substantially in contact with the feed roller 6. The drag preventive member 10 allows the foremost cut sheet of the bundle 4 to be suitably fed by the feed roller 6 while preventing the next cut sheet from being frictionally dragged by the advancing foremost cut sheet.

The gear box 7 carries a photosensor 11 forwardly from the receiver stand 5. The photosensor 11 includes an opposed pair of light emitting and light receiving elements. In counting, a corner (lower right corner in the illustrated embodiment) of each cut sheet of the bundle 4 passes and interrupts the gap between the light emitting element and the light receiving element, thereby providing one count for counting up.

In addition to the above-described components, the main case member 2 further accommodates a control unit 12, a power supply box 13, and a power switch 14. The control unit 12 includes a counter circuit 12*a* (see FIG. 12) which performs a counting-up operation in response to a detection signal from the photosensor 11, and a memory circuit 12*b* (see also FIG. 12) for memorizing the count. The power supply box 13 receives a battery or batteries 17. Further, the main case member 2 has an upper wall provided with a count display 15 for indicating the count memorized in the memory circuit, and an operation push button 16.

In the illustrated embodiment, the upper wall of the main case member 2 is also formed with a bevel discharge guide edge 2*a* for directing a discharged cut sheet toward the closure case member 3.

Figure 12:
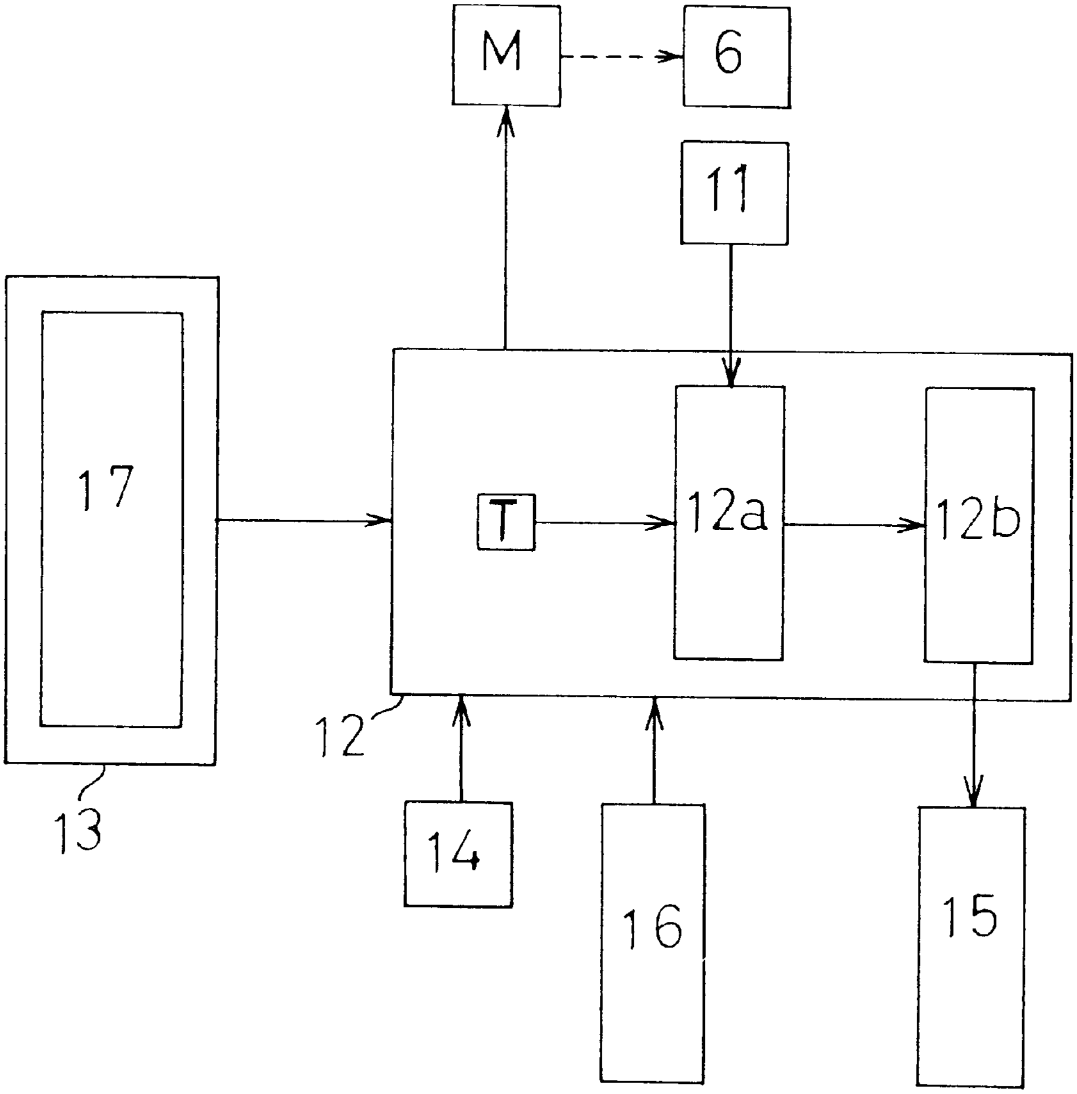
FIG. 12 is a block diagram showing a control unit of the same counter.

FIG. 12 is a control block diagram of the cut sheets counter 1. As shown in this figure, the battery 17 housed in the power supply box 13 is connected to the control unit 12 which, as previously described, includes the counter circuit 12*a* and the memory circuit 12*b*, provides overall control. The control unit 12 is also connected to the drive motor M for the feed roller 6, the photosensor 11, the power switch 14, the count display 15, and the operation push button 16.

The counter circuit 12*a* of the control unit 12 performs a counting operation on the basis of a detection signal from the photosensor 11 and timing signals from a timer T. Specifically, a pulse rises when light between the light emitting and receiving elements of the photosensor 11 is interrupted by a corner of each cut sheet, whereas the pulse drops when the light receiving element receives light again upon complete passage of the sheet corner. The counter circuit 12*a*, which also receives the timing signals from the timer T, starts measuring the time simultaneously with the rise of the pulse. If the pulse falls within a preset time, the counter circuit 12*a* counts "one (1)" for input to the memory circuit 12*b* where addition is performed for indicating an added count at the count display unit 15. If, on the other hand, the pulse does not fall within the preset time, the counter circuit 12*a* recognizes abnormality and transmits a count error indication to the count display 15 (e.g. by flickering of the displayed number) via the memory circuit 12*b*.

Returning to FIGS. 1 through 7, the closure case member 3 is hinged to the bottom front portion of the main case member 2, so that the closure case member 3 rests on the surface of a support such as table when opened for counting (see particularly FIGS. 1, 3 and 5). The closure case member 3 is provided with a stacking guide 18 for facilitating collection and stacking of the cut sheets when they are successively discharged after counting.

Figure 2:
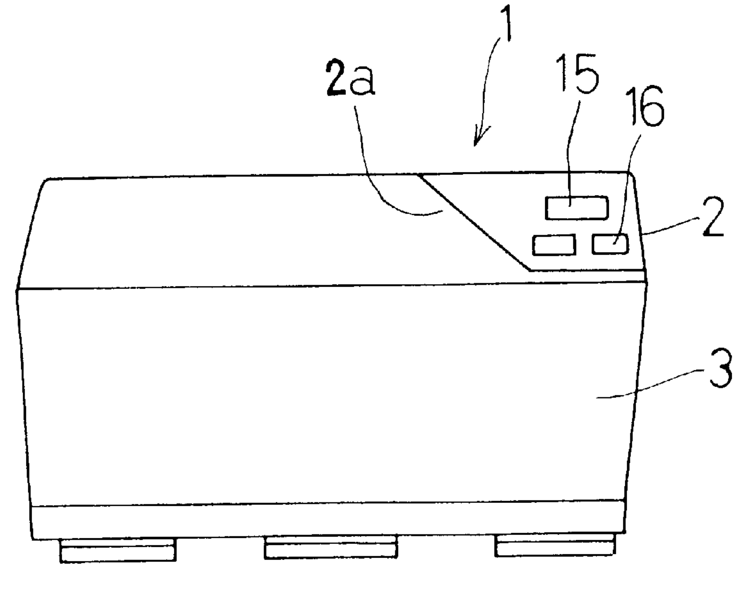
FIG. 2 is a perspective view of the same counter in its closed state.
Figure 3:
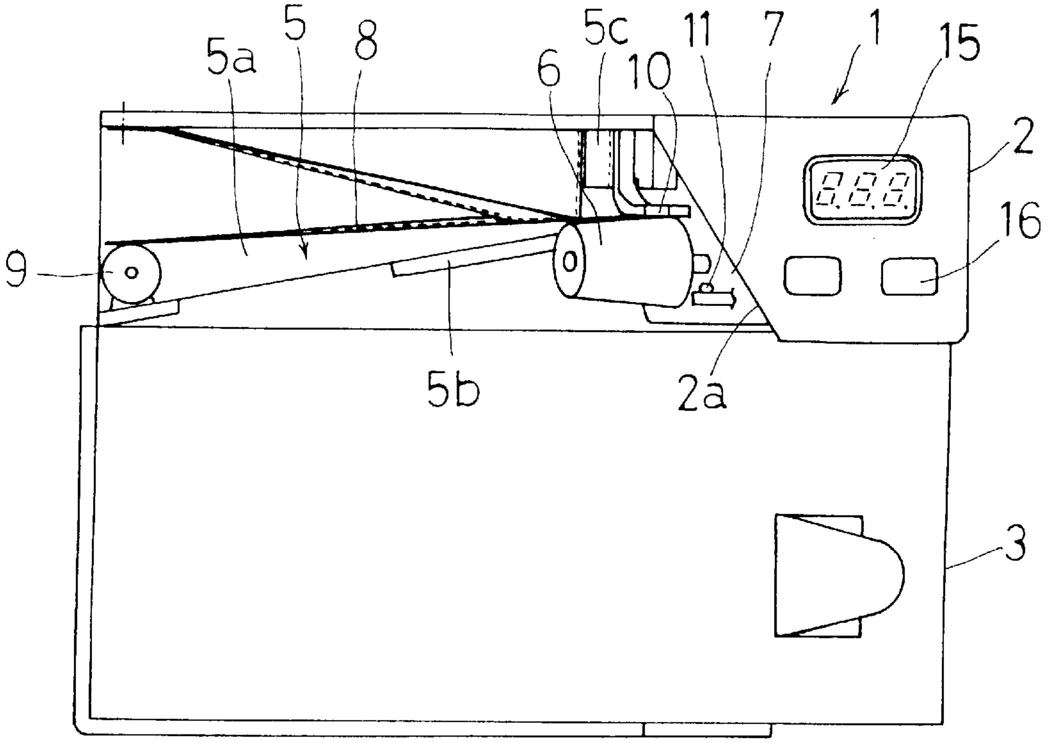
FIG. 3 is a top plan view of the same counter in its open state.
Figure 4:
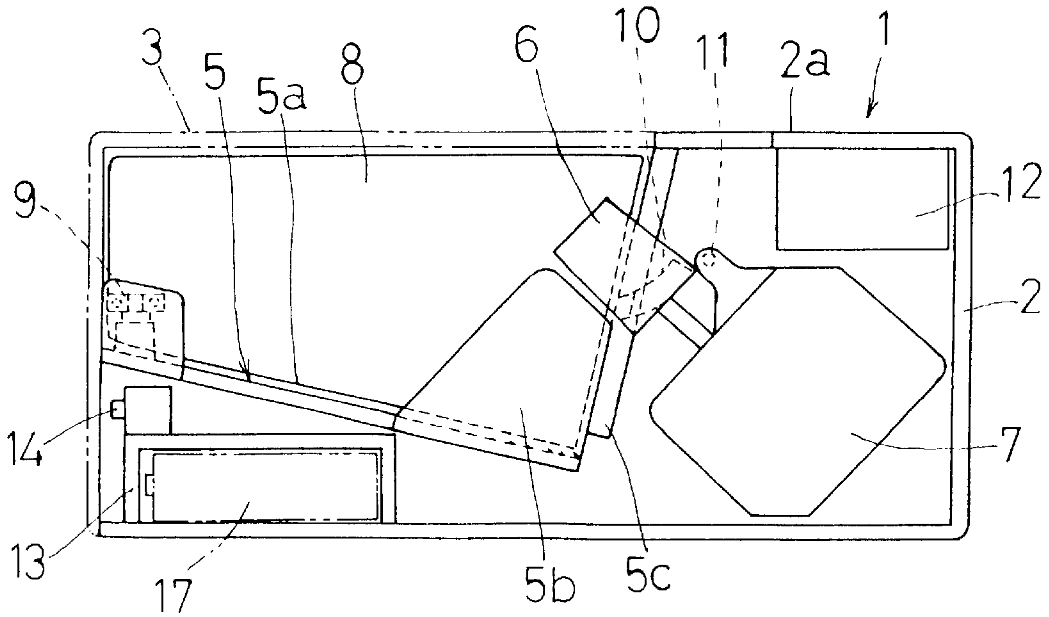
FIG. 4 is a front view showing a main case member of the same counter.
Figure 5:
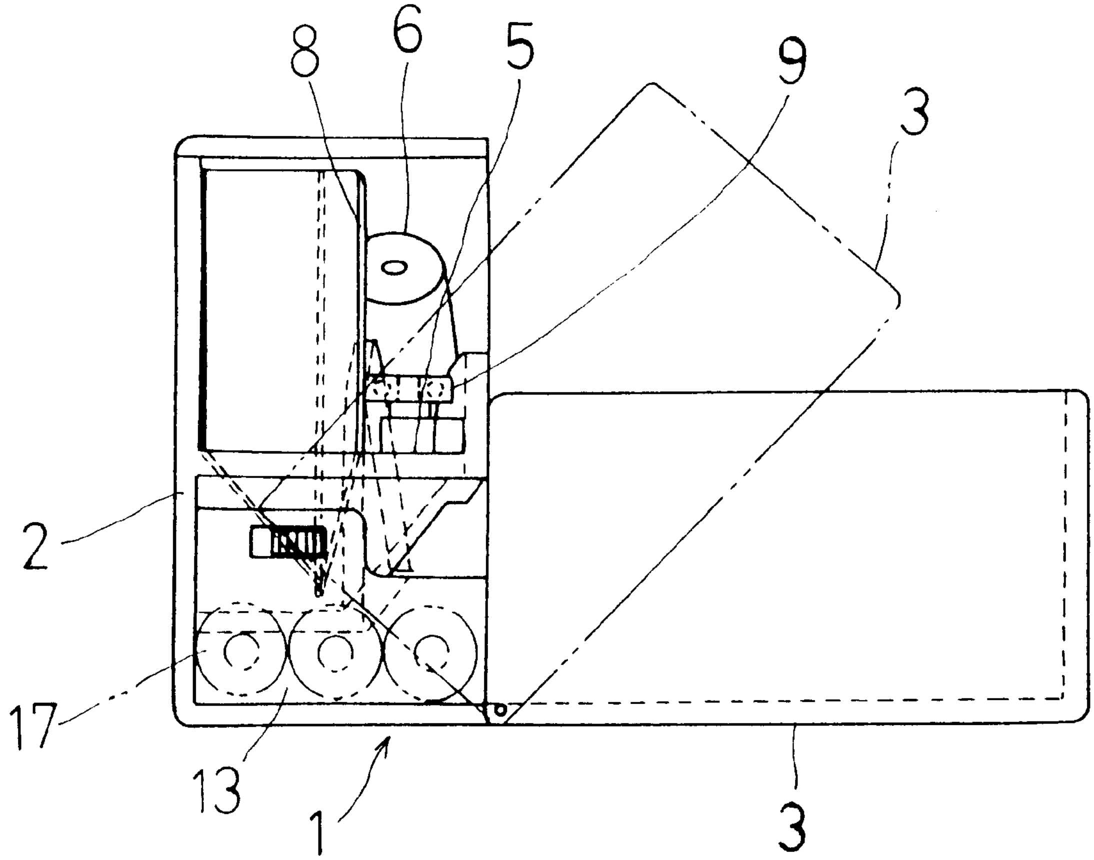
FIG. 5 is a side view showing the same counter.

The cut sheets counter 1 may be conveniently carried by a business person in the closed state illustrated in FIG. 2. As need arises for counting bank notes for example, the closure case member 3 is pivoted open, and a bundle 4 of bank notes is placed on the receiver stand 5 under the biasing force of the presser spring 8, as shown in FIG. 6. Upon pressing the operation push button 16 for start, the bank notes are successively fed obliquely upward one by one, as indicated by phantom lines 4*a* in FIG. 7. A corner of each successively fed note is detected by the photosensor 11 for counting, and the counted number is indicated at the count display 15. After passage across the photosensor 11, the bank note is discharged obliquely forward onto the closure case member 3 and guided by the guide 18 for stacking, as indicated by phantom lines 4' in FIG. 7.

A counting operation provided by the counter 1 is more specifically described below with reference to FIGS. 8*a* to 11*b*.

Figure 8A:
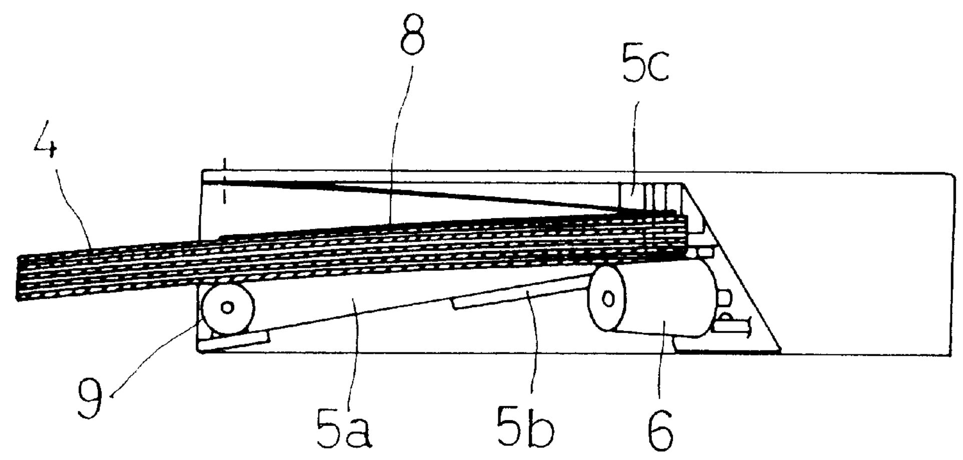
FIGS. 8*a* and 8*b* are a plan view and a front view, respectively, showing the main case member of the same counter with the bundle of cut sheets immediately before starting a counting operation.
Figure 8B:
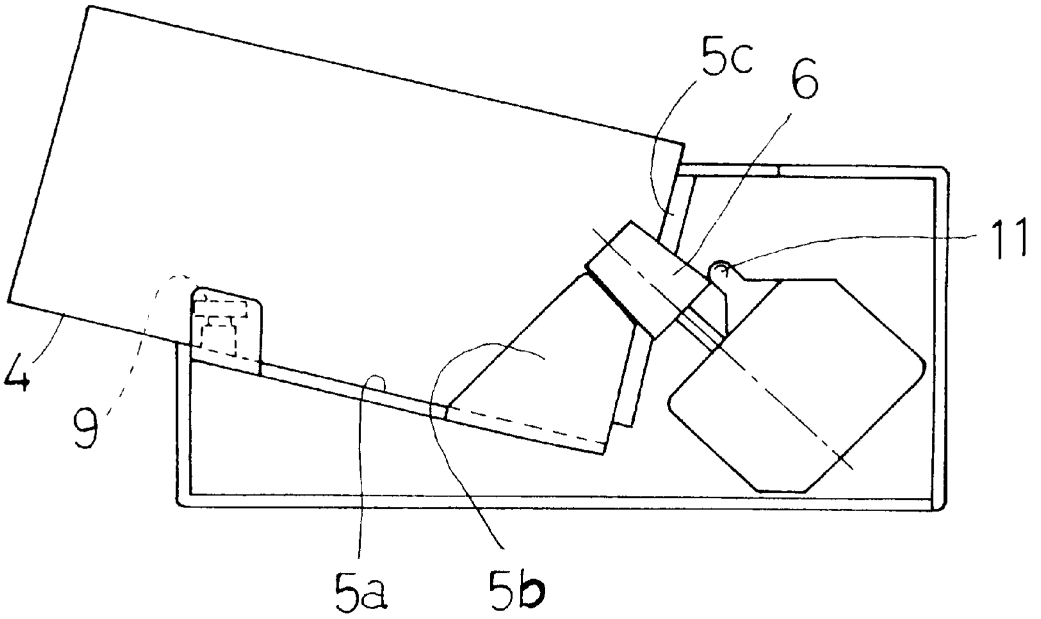

First, as shown in FIGS. 8*a* and 8*b*, a bundle 4 of cut sheets 4*a* is placed on the receiver stand 5. In this condition, the movement of the bundle 4 in the plane of each cut sheet 4*a* is prevented by the bottom support portion 5*a* and leading edge retainer portion 5*c* of the receiver stand 5. Further, viewed in the stacking direction, the cut sheets bundle 4 is pressed from behind by the presser spring 8 against the front retainer portion 5*b* of the receiver stand 5, the feed roller 6 and the opposing presser roller 9.

Figure 9A:
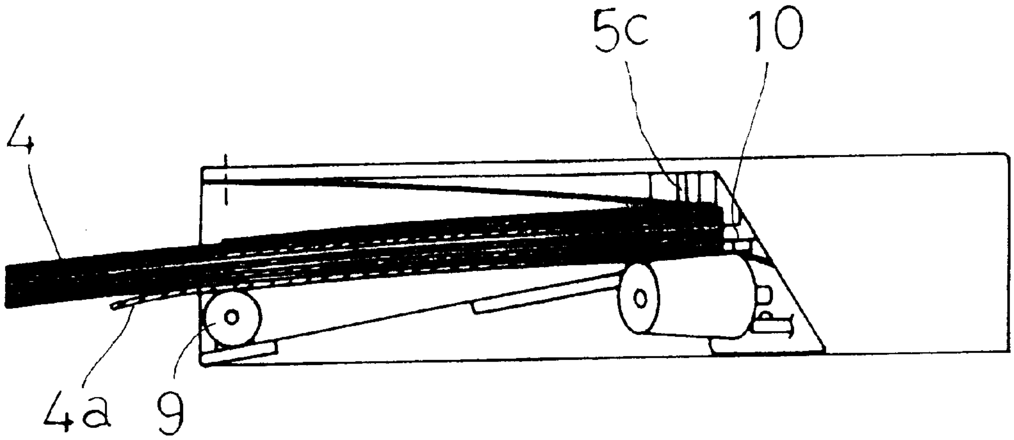
FIGS. 9*a* and 9*b* are a plan view and a front view, respectively, showing the main case member of the same counter with the bundle of cut sheets immediately after starting the counting operation.
Figure 9B:
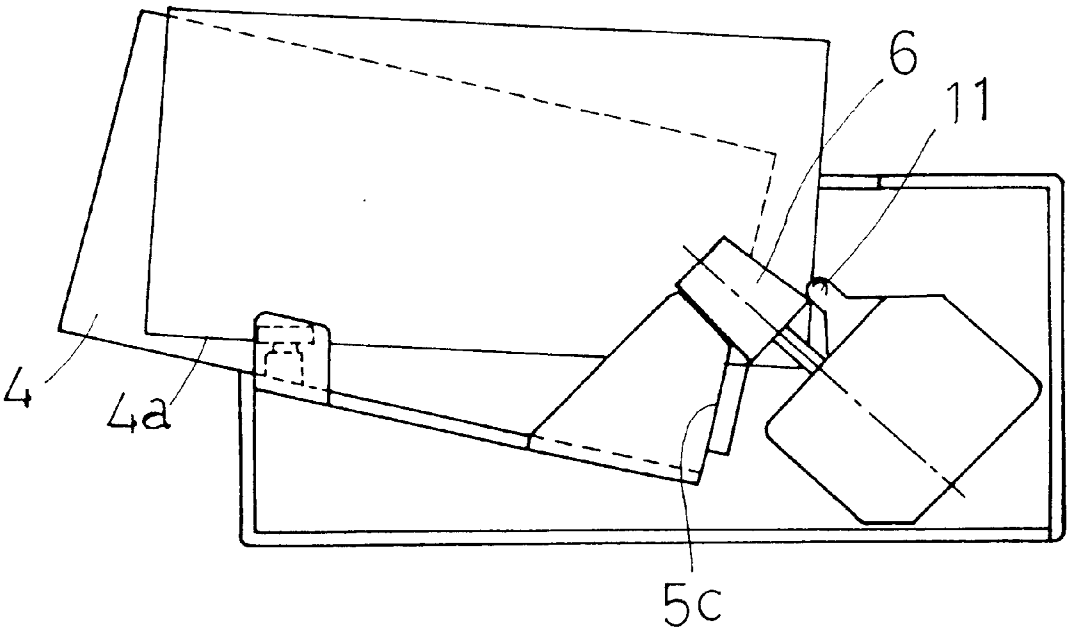

When the feed roller 6 starts rotating, the foremost cut sheet 4*a* in contact with the feed roller 6 is fed obliquely upward relative to the remaining cut sheets bundle 4, as shown in FIGS. 9*a* and 9*b*. At this time, some sheets of the remaining bundle 4 may tend to be frictionally pulled by the foremost sheet 4*a*. However, due to the provision of the drag preventive member 10, the frictionally pulled sheets are prevented from being dragged past the drag preventive member 10. Thus, the foremost sheet 4*a* alone is allowed to pass the gate between the feed roller 6 and the drag preventive member 10. During oblique upward movement, a corner (lower right corner) of the foremost sheet 4*a* interrupts light transmission in the photosensor 11.

Figure 10A:
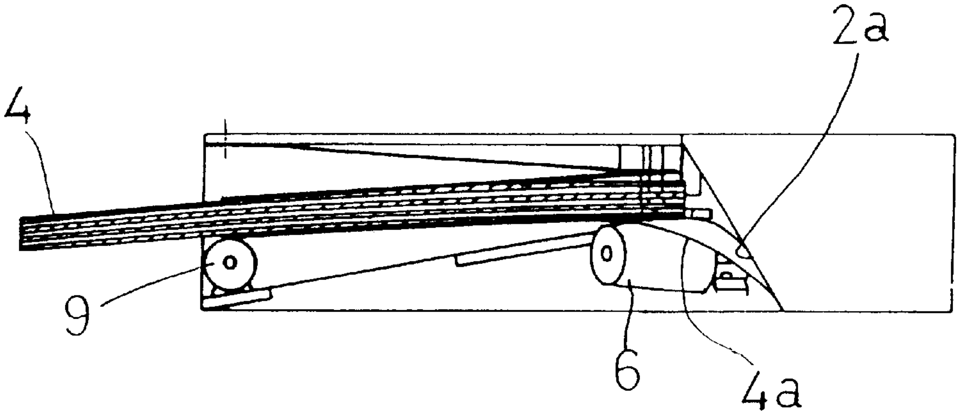
FIGS. 10*a* and 10*b* are a plan view and a front view, respectively, showing the main case member of the same counter with the bundle of cut sheets after count of a foremost cut sheet is completed.
Figure 10B:
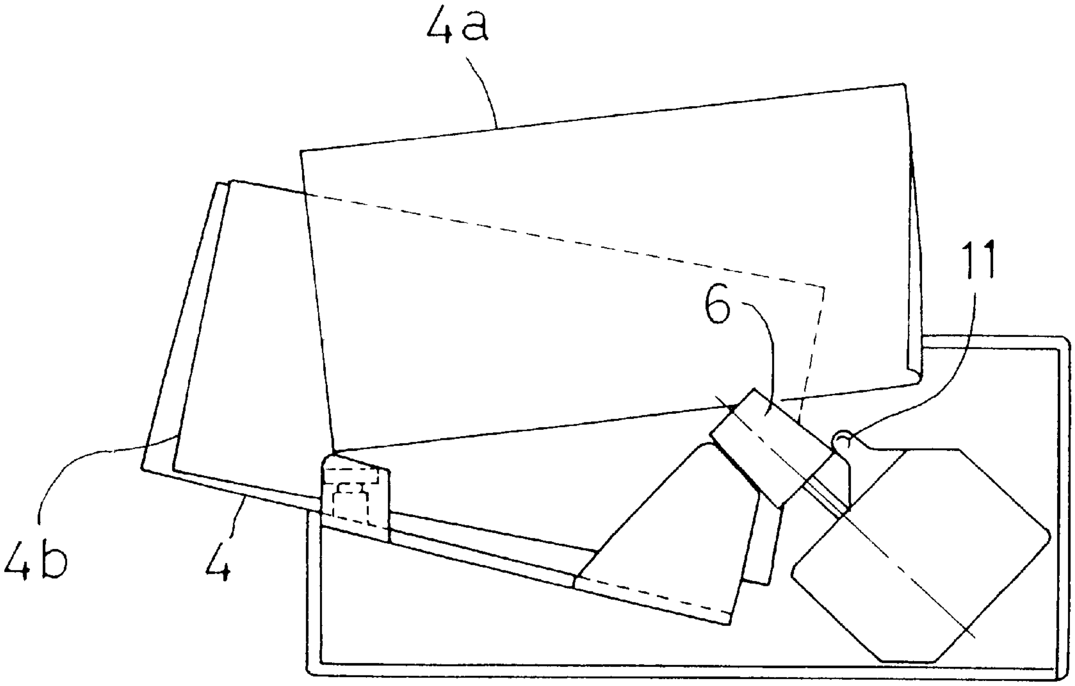

As shown in FIGS. 10*a* and 10*b*, when the corner of the foremost sheet 4*a* completely moves beyond the photosensor 11, the counter circuit 12*a* adds a count of one sheet. Upon further oblique upward movement of the foremost sheet 4*a*, the discharge guide 2*a* of the main case member 2 comes into guiding contact with the sheet and directs it toward the closure case member 3 (see FIG. 7).

Figure 11A:
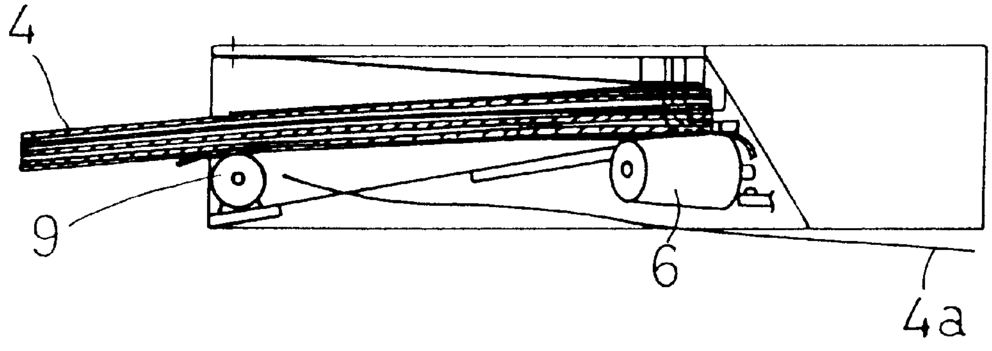
FIGS. 11*a* and 11*b* are a plan view and a front view, respectively, showing the main case member of the same counter with the bundle of cut sheets immediately after discharging the foremost cut sheet.
Figure 11B:
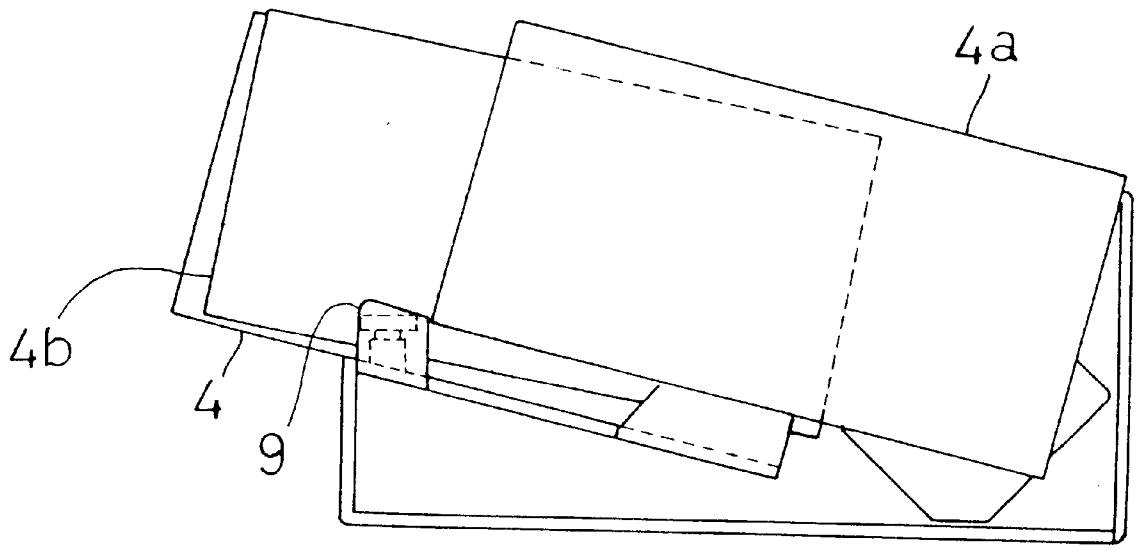

When the lower longitudinal edge of the foremost sheet 4*a* moves completely past the feed roller 6, the foremost sheet 4*a* is discharged toward the closure case member 3 (FIG. 7) beyond the feed roller 6 due to the guiding function of the discharge guide 2*a* while keeping its standing posture, as shown in FIG. 11*a* and 11*b*. Then, the discharged sheet 4*a* falls gravitationally onto the closure case member 3 and lies down for stacking as guided by the stacking guide 18 (see FIG. 7).

In the meantime, the next cut sheet 4*b* of the bundle 4 comes into feeding contact with the feed roller 6 immediately after the foremost cut sheet 4*a* comes out of frictional contact with the feed roller 6. Of course, the next sheet 4*b* is counted by repeating the steps shown in FIGS. 8*a* through 11*b*.

The counter 1 according to the illustrated embodiment is capable of counting a total of e.g. up to 100 cut sheets at a time, and the required counting time may be less than 10 seconds for example. Further, the weight of the counter 1 may be no larger than e.g. 400 g, and the size thereof need only to be slightly larger than a bank note with respect to the length and height while the width of the counter may also be rendered relatively small. Thus, the counter provides good portability and may be used at various places.

Further, the combination of the feed roller 6 and the drag preventive member 10 prevents erroneous feed of the cut sheets while ensuring that each cut sheet assumes a predetermined posture in passing across the photosensor 11. Thus, the counter 1 provides reliable detection (namely, counting) of the cut sheets.

According to the illustrated embodiment, the feed roller 6 has a frustum shape with an inclined axis of rotation. However, the feed roller 6 may be cylindrical, and the axis of its rotation may extend horizontally or vertically. Further, the feed roller 6 may be replaced by an endless feed belt driven by pulleys.

It should be appreciated here that when the feed roller 6 has a frustum shape with an inclined axis of rotation (as in the illustrated embodiment), the detection corner (e.g. lower right corner) of each cut sheet moves obliquely upward along an arcuate path. By contrast, if the feed roller 6 is cylindrical with an inclined axis of rotation, the detection corner of each cut sheet moves obliquely along a straight path.

According to the illustrated embodiment, the photosensor 11 is made to detect passage of the lower right corner of each cut sheet. However, optical detection may be made of any other corner of the cut sheet depending on the feed direction provided by the feed roller 6 (or other feed means).

The shape of each cut sheet may be rectangular (as in the illustrated embodiment) or square. Further, each or any corner of the cut sheet may be chamferred like a gift coupon (to provide a main chamfer corner accompanied by two 135° subcorners if a 45° chamfer is made). In the latter case, the photosensor 11 may be made to detect either the main chamfer corner or one of the 135° subcorners.

In the illustrated embodiment, the bundle 4 of cut sheets is supported in a standing posture with the shorter sides of each cut sheet directed upward. However, the bundle 4 of cut sheets may be supported on the receiver stand 5 in a standing posture with the longer sides of each cut sheet directed upward. Further, the bundle 4 of cut sheets may be supported in a lying posture.

The drag preventive member 10 may be in form of a lip or tongue as in the illustrated embodiment. Alternatively, the drag preventive member 10 may be in the form of a cylindrical body which is non-rotable (or rotable only in a non-feeding direction).

Further, the drag preventive member 10 may be held substantially in contact with the feed roller 6 (as in the illustrated embodiment) or slightly spaced therefrom with a predetermined gate clearance which is larger than the thickness of one sheet but smaller than the combined thickness of two sheets.

In the illustrated embodiment, the presser spring 8 is in the form of a leaf spring. However, the presser spring 8 may comprise any one of a compression spring, a tension spring and a constant force spring. Further, the presser spring 8 may be replaced by a presser member which acts gravitationally on the bundle 4 of cut sheets supported in a lying posture.

According to the illustrated embodiment, the opposing presser roller 9 for preventing pivotal movement of each cut sheet is arrranged to press a lower left corner portion of the cut sheet.

However, the opposing presser roller 9 may be made to press any portion of the cut sheet which is spaced from the leading edge of the cut sheet.

In the illustrated embodiment, the discharged cut sheets are collected and stacked again at a location spaced from the receiver stand 5. However, even after counting, the cut sheets may be collected on the receiver stand 5 with a different orientation than when they are supported on the receiver stand 5 before counting.

In the illustrated embodiment, a corner of each cut sheet is detected by the photosensor 11. However, such detection may be otherwise performed, and subsequent processing of the detection for counting may be performed in any known manner.

The counter of the present invention may be an independent device which is portable as in the illustrated embodiment. Alternatively, the counter may constitute a part of an overall cut sheets processing machine such as a cash dispenser. In the latter case, the receiver stand 5 corresponds to a storage receiver for each different kind of bank notes (or a cartridge holding each different kind of bank notes), and each bank note is discharged onto a transfer path to a cash outlet after counting or onto a tray which is vertically movable to a cash outlet.

Further, if the counter of the present invention need be used to count a predetermined number of cut sheets and then stop counting (as required when used as a part of a cash dispenser), a control may be added to slow down the feed speed when the predetermined number approaches. For instance, when it is necessary to count 90 sheets, the feed speed may be slowed down upon counting 87 sheets for reliably stopping at 90. With such control, if the predetermined number is 3, counting starts at a low speed from the very beginning.

The present invention being thus described, it is obvious that the same may be varied in many other ways. Such variations are not to be regarded as a departure from the spirit and scope of the invention, and all such variations as would be obvious to those skilled in the art are intended to be included within the scope of the following claims.

I claim:

1. A method for counting cut sheets comprising the steps of:

supporting a loose bundle of cut sheets in a predetermined posture, each of the cut sheets having a comer defined by a first edge and a second edge adjoining said first edge;

successively feeding the cut sheets of the supported bundle obliquely relative to an edge of each remaining cut sheet of the supported bundle;

detecting said comer of each successively fed cut sheet by successive passage of said first edge and said second edge across a predetermined position; and processing a detection signal to provide a count of each said successively fed cut sheet.

2. A device for counting cut sheets comprising:

a receiver member for supporting a loose bundle of cut sheets in a predetermined posture each of the cut sheets having a comer defined by a first edge and a second edge adjoining said first edge;

a feed member for frictionally feeding the cut sheets of the supported bundle successively and obliquely relative an edge of each remaining cut sheet of the supported bundle;

drive means for driving the feed member;

a drag preventive member provided in facing relation to the feed member for preventing each remaining cut sheet of the bundle from being dragged by a previously fed cut sheet;

detection means provided near the feed member for detecting said comer of each successively fed cut sheet by passage of said first edge and said second edge across the detection means; and counting means for processing a detection signal from the detection means to provide a count of each successively fed cut sheet.

3. The device according to claim 2, wherein each cut sheet is elongate with two shorter edges and two longer edges, the receiver member supporting the bundle of cut sheets in a standing posture with the shorter edges of each cut sheet directed upward, the feed member comprising a feed roller held in contact with the leading shorter edge of each cut sheet of the supported bundle, the feed roller having a rotary axis which is contained in a plane substantially parallel to the plane of each cut sheet of the supported bundle but inclined relative to the longer edges of each cut sheet.

4. The device according to claim 3, further comprising a presser member for pressing the supported bundle of cut sheets against the feed roller, and an opposing pressing roller held in contact with the trailing shorter edge of each cut sheet of the supported bundle for preventing each fed cut sheet from pivoting about the feed roller.

5. The device according to claim 3, wherein the receiver member supports the bundle of cut sheets in a manner such that said one shorter edge of each cut sheet of the supported bundle is positioned lower than the other shorter edge of each cut sheet.

6. The device according to claim 3, wherein the feed roller has a frustum shape.

7. The device according to claim 2, wherein the receiver member, the feed member, the drive means, the detection means and the counting means are accommodated in a main case member to which a closure case member is hinged for opening and closing the main case member.

8. The device according to claim 7, wherein the closure case member is hinged to a bottom portion of the main case member, the feed-member feeding each cut sheet of the supported bundle for discharging upwardly and toward the closure case member which is pivoted open.

9. The device according to claim 8, wherein the main case member has an upper wall formed with a bevel discharge guide edge for smoothly directing each discharged cut sheet toward the closure case member which is pivoted open.

10. The device according to claim 8, wherein the closure case member is provided with a stacking guide for guiding successively discharged cut sheets into a stack for re-bundling.

11. The device according to claim 2, further comprising a presser member for pressing the supported bundle of cut sheets against the feed member.

* * * * *